(No Model.)
J. H. FERGUSON.
DUMPING CART.
No. 264,679. Patented Sept. 19, 1882.
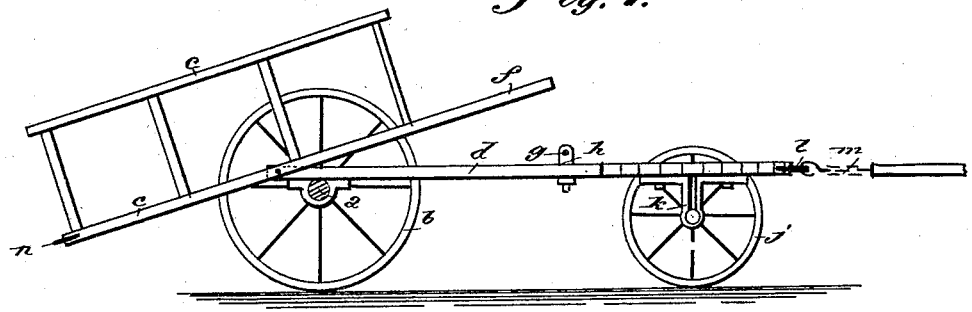
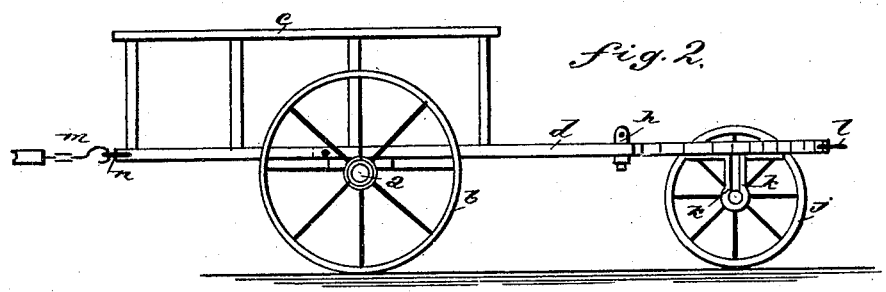
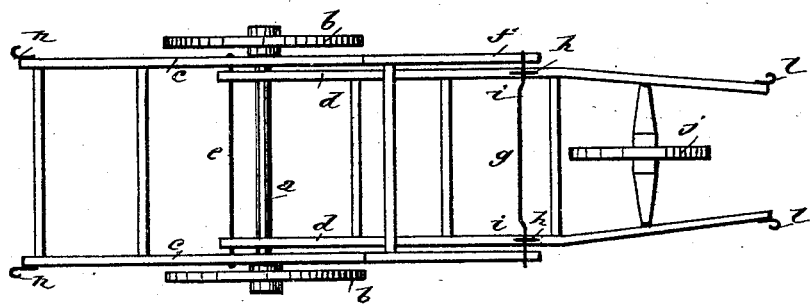
WITNESSES:
INVENTOR:
J. H. Ferguson
BY Munn & Co
ATTORNEYS.

UNITED STATES PATENT OFFICE.

JOHN H. FERGUSON, OF DAYTON, TENNESSEE.

DUMPING-CART.

SPECIFICATION forming part of Letters Patent No. 264,679, dated September 19, 1882.

Application filed June 24, 1882. (No model.)

*To all whom it may concern:*

Be it known that I, JOHN H. FERGUSON, of Dayton, in the county of Rhea and State of Tennessee, have invented a new and Improved Dump-Cart, of which the following is a full, clear, and exact description.

My invention consists of a dump-cart having a third wheel located between the shafts to carry the weight commonly supported on the back of the horse by the shafts, and contrived with hitching devices at the rear by which to hitch on the horse so as to draw the loaded cart backward to the dumping-place, together with hitching devices at the front end for hitching thereat after the cart is dumped to draw it forward to the loading-place, and thus avoid the turning of the cart at both ends of the route, whereby considerable economy of labor will be effected, besides saving the deep cross-ruts formed in the roadway by turning the carts, especially at the dumping-place, and thus preserving much smoother and easier roadways over which the carts have to be drawn in making embankments for railroads and the like, all as hereinafter fully described.

Reference is to be had to the accompanying drawings, forming a part of this specification, in which similar letters of reference indicate corresponding parts in all the figures.

Figure 1 is partly a side elevation of my improved dump-cart and partly a sectional elevation, showing the hitching devices at the front or for returning the dumped cart to the loading-place. Fig. 2 is a side elevation, showing the hitching devices attached to the rear or for drawing the loaded cart to the dumping-place; and Fig. 3 is a plan view of the said cart.

The main axle $a$, wheels $b$, and the body $c$ may be of the usual or any approved form or arrangement, the body $c$ being pivoted to the rear ends of the shafts $d$ by a rod, $e$, for tilting up the body of the cart for dumping out the load. The front ends, $f$, of the body-frame are to be secured to the shafts $d$ in the usual manner by a rod, $g$, arranged in eye-studs $h$ on the shafts and projecting over the said ends of the body-frame. The said rod is cranked a little at $i$ to prevent it from shaking out of the eye-studs either way. Instead of hitching the horse between the shafts to carry the weight of the load forward of the axle on his back by the back-strap, I propose to employ a wheel, $j'$, located, as shown, between the shafts and mounted in pedestals $k$, attached to the shafts. The shafts are provided with hooks $l$ at their ends for hitching a horse thereto by chains $m$ or other suitable means, so that, together with the hitching attachments $n$ behind the cart, the cart may be worked forward and backward between the loading and the dumping places without turning it, thereby economizing largely in labor, as before stated.

I am aware that, broadly, the employment of a third wheel with a vehicle is not new, and do not lay any claim to such *per se.*

Having thus described my invention, I claim as new and desire to secure by Letters Patent—

A three-wheeled vehicle having the dump-body $c$ provided with the short shafts $d$, with the wheel $j$ journaled between them, and provided at their forward ends with hooks $i$, as shown and set forth, and for the purpose described.

JOHN H. FERGUSON.

Witnesses:
A. C. BROYLES,
W. J. BANKS.